J. C. SCHLEICHER.
SEALED DRINKING VESSEL.
APPLICATION FILED MAR. 18, 1909.
939,554.
Patented Nov. 9, 1909.
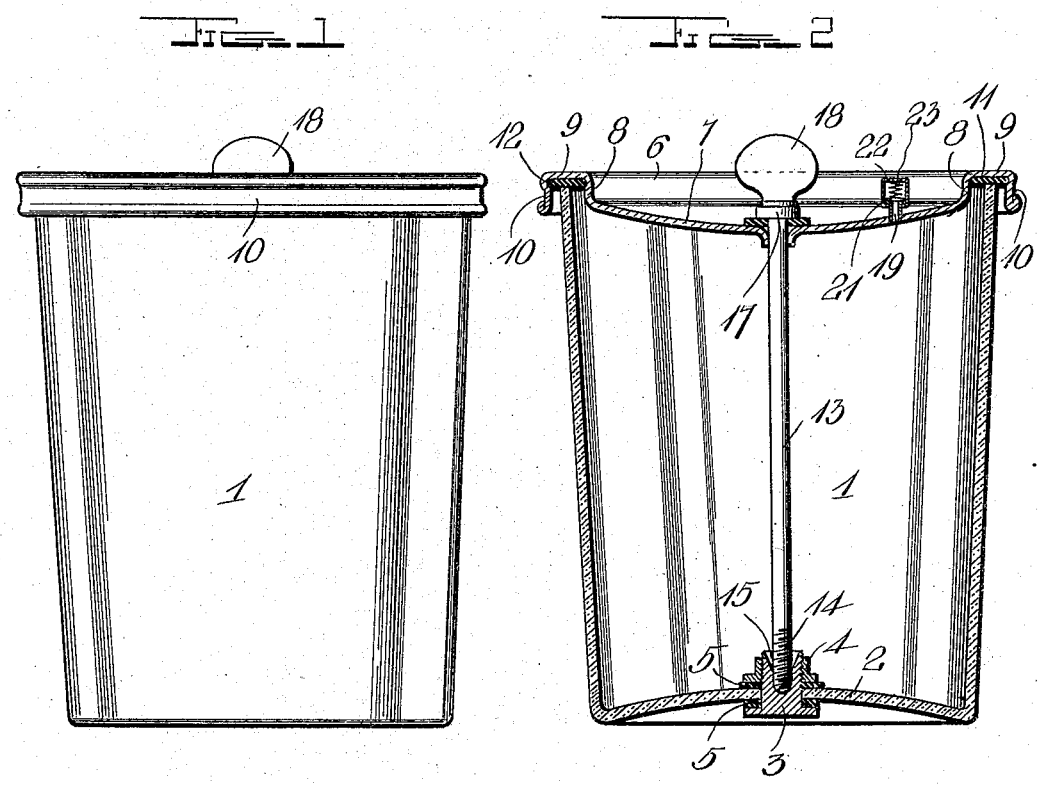
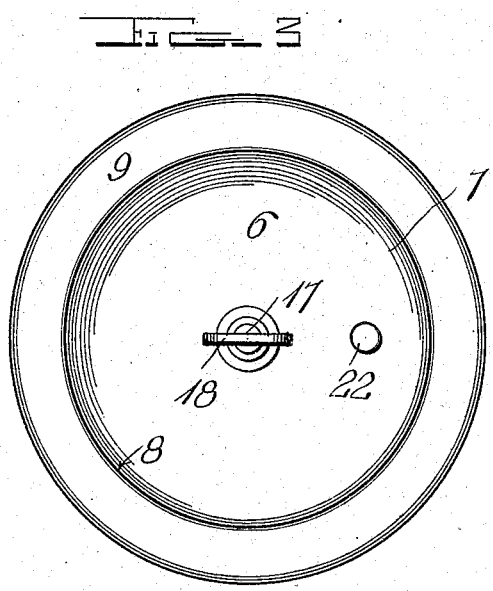
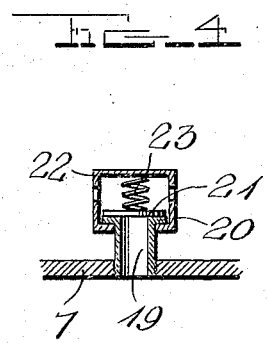
Witnesses
Inventor
John C. Schleicher
by H. B. Willson & Co.
Attorneys

UNITED STATES PATENT OFFICE.

JOHN C. SCHLEICHER, OF NEW YORK, N. Y.

SEALED DRINKING VESSEL.

939,554.

Specification of Letters Patent. Patented Nov. 9, 1909.

Application filed March 18, 1909. Serial No. 484,176.

*To all whom it may concern:*

Be it known that I, JOHN C. SCHLEICHER, a citizen of the United States, residing at New York, in the county of New York and State of New York, have invented certain new and useful Improvements in Sealed Drinking Vessels; and I do declare the following to be a full, clear, and exact description of the invention, such as will enable others skilled in the art to which it appertains to make and use the same.

My invention relates to sealed drinking vessels and particularly to glasses which are used in saloons, although adapted to contain any character of material.

It is the object of the invention to provide a glass which will in a way supersede the large bottles now on the market containing liquid refreshment. For instance a man who drinks Guinness' stout or Bass' ale frequently does not care for the entire bottle, yet if he purchases the same in a restaurant he is compelled to drink the full bottle or waste what he does not care for at that time. Again the glasses which are used in restaurants are usually unsanitary being only washed in water which has been continuously used maybe for days past or for the purpose of washing a number of glasses before.

It is the object of my invention to provide an absolutely sanitary glass which may be sealed by the manufacturer and opened by the consumer who is thereby assured of its originality and genuineness and also that the glass from which he is drinking is purely sanitary. The vessel may be constructed of any suitable material and is preferably sealed in bond or some arrangement is made whereby the customs seal when broken shows the original contents to have been used.

With this and other objects in view, the invention consists of certain novel features of construction, combination and arrangement of parts as will be more fully described and particularly pointed out in the appended claims.

In the drawing: Figure 1 is a side elevation with parts in elevation; Fig. 2 is a vertical sectional view; Fig. 3 is a plan view, and, Fig. 4 is an enlarged sectional view of the vent valve.

I have shown the invention applied herein to an ordinary drinking glass, but I wish it understood that the application of the principle may be used in other connections or with other forms of receptacles 1.

In the drawings 1 indicates a glass whose bottom 2, is centrally apertured to receive the screw plug 3, which is threaded upon its reduced extension so as to receive the clamping nut 4. Interposed between the headed end of the plug 3, and the glass and between the inner side of the glass and the clamping nut 4, are suitable washers 5, which may be of any material, but which are made to suit the contents of the vessel so that they will not be affected thereby.

The cap 6, shown herein comprises an annular disk 7, which has arranged around its periphery the upwardly and outwardly turned flanges 8, and 9, and the downwardly turned flanges 10. These flanges form a circular channel 11, adapted to receive a packing ring 12, which rests upon the edge of the receptacle 1, and is adapted to prevent the entrance of any air to the vessel. In order to hold this cap 6, upon the receptacle, I provide a central aperture in the disk 7, through which is passed a connecting rod 13, having threads 14, on its lower end adapted to adjustably engage the threaded socket 15, in the upper end of the plug 3. A suitable washer 16, surrounds the upper end of the rod and is arranged between the disk 7, and the headed end 17, of the rod so as to prevent the escape or entrance of air from or to the vessel. A thumb piece 18, is attached to the headed end of the rod for the manipulation thereof.

When the receptacle is used for carbonated liquids which are liable to ferment, I provide a vent valve which is constructed as follows: The tube 19, leads from the disk 7, and has arranged at its upper end, an outstanding flange 20 which forms a seat for the valve cap 21, a frame work 22, is secured in position upon tube 19, and carries a spiral spring 23, adapted to bear upon the valve cap 21, so as to normally press the same against the seat and prevent the exit of any air except that the pressure in the vessel reaches a predetermined degree which will overcome the tension of the spring.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:

1. A device of the class described comprising a receptacle, a cap for the receptacle, a packing channel in the cap adapted to receive the rim of the receptacle, and means passing through the cap and connected to the bottom of the receptacle for sealing the cap upon the receptacle.

2. A device of the class described comprising a receptacle, a threaded plug secured in the bottom of the receptacle, a cap, a sealing ring carried thereby adapted to engage the rim of the receptacle and a rod passing through the cap and threaded into the plug in the bottom of the receptacle whereby the cap is fastened and sealed upon the receptacle.

3. A device of the class described comprising a receptacle, a connecting device secured to the bottom of the receptacle, a cap for closing the mouth of the receptacle, means passing through the cap adapted to be adjustably secured to the connecting device for securing the cap upon the receptacle and a venting device carried by the cap.

In testimony whereof I have hereunto set my hand in presence of two subscribing witnesses.

JOHN C. SCHLEICHER.

Witnesses:
E. EDMONSTON, Jr.,
J. P. DUFFIE.